United States Patent [19]
Garceau

[11] Patent Number: 5,501,428
[45] Date of Patent: Mar. 26, 1996

[54] STABILIZER JACK

[75] Inventor: Bernard F. Garceau, Granger, Ind.

[73] Assignee: Norco Industries, Inc., Compton, Calif.

[21] Appl. No.: 355,697

[22] Filed: Dec. 14, 1994

[51] Int. Cl.⁶ .................................................. B66F 7/24
[52] U.S. Cl. .................................................. 254/424
[58] Field of Search .................................. 254/126, 424, 254/425, 419, 420, 418; 280/475

[56] References Cited

U.S. PATENT DOCUMENTS

| | | |
|---|---|---|
| D. 349,801 | 8/1994 | Few et al. . |
| 2,358,488 | 9/1944 | Black . |
| 3,345,038 | 10/1967 | Taylor . |
| 3,565,396 | 2/1971 | Spear . |
| 3,656,778 | 4/1972 | Bristol . |
| 3,722,948 | 3/1973 | Walsh et al. . |
| 3,826,470 | 7/1974 | Spear . |
| 4,103,869 | 8/1978 | Mesny et al. . |
| 5,042,779 | 8/1991 | Eden . |
| 5,205,586 | 4/1993 | Tallman . |

*Primary Examiner*—Robert C. Watson
*Attorney, Agent, or Firm*—Fulwider, Patton, Lee & Utecht

[57] ABSTRACT

An improved stabilizer jack for securement to the underside of a recreational vehicle. The jack includes a channel frame formed with downwardly and inwardly turned sidewalls terminating in spaced apart retaining edges forming a track. A hanger bracket is mounted to the frame having a pair of laterally opposite projecting axle tabs and a screw is rotatably mounted to the bracket and restrained against longitudinal movement. A trunnion plate is carried in the track and includes a threaded bore for engaging the screw. A support leg projects downwardly and outwardly from the track and has one end thereof pivotally carried from the trunnion plate, the medial portion of the support leg being pivotally connected to one end of a strut. The opposite end of the strut is formed with upwardly turned retainer flanges spaced laterally apart, the flanges each including an axle tab bore. The hanger bracket axle tabs are received in the axle tab bores so that the upwardly turned retainer flanges are received in closed spaced relation between the inwardly turned retaining edges of the channel frame to constrain the flanges from lateral outward spreading to retain the axle tab bores on the axle tabs.

17 Claims, 4 Drawing Sheets

STABILIZER JACK

BACKGROUND OF THE INVENTION

1. Field of the Invention

The present invention relates to devices for stabilizing stationary recreational vehicles and particularly to an improved stabilizer device mountable to the underside of such vehicle.

2. Description of the Prior Art

Recreational vehicles and trailers typically incorporate spring suspension systems mounted between the chassis frame and the wheels to provide a smooth ride during transit. While such suspension systems enhance passenger comfort and minimize vibration, they often detract from the stability of the passenger compartment when the vehicle is parked. For example, when passengers move about the compartment, the vehicle tends to rock both fore and aft as well as from side to side. Furthermore, this rocking motion is enhanced due to the inherent flexibility of the wheels and slight rolling thereof in response to forward and rearward weight shifting within the vehicle cabin.

The industry has addressed such vehicle stability concerns by developing various stabilizer jack devices and systems for use with the vehicles when stationary or parked. For example, such devices are disclosed in U.S. Pat. Nos. 3,565,396; 3,826,470, and 5,205,586.

One stabilizer jack device incorporates an elongated downwardly opening mounting channel formed with downwardly turned longitudinal marginal flanges. A cylindrical trunnion is formed with a transverse through threaded bore for receipt of a drive screw rotatably mounted at one end of the mounting channel. The lateral opposite ends of the cylindrical trunnion pivotally mount a support leg extending longitudinally and downwardly therefrom. One end of a channel shaped strut has laterally spaced apart upwardly turned flanges and is pivotally mounted medially to the support leg and angles upwardly and longitudinally therefrom. A bracket at the opposite end of the mounting channel is formed with outwardly flared axle tabs for pivotally mounting to the opposite end of the strut. Difficulties with this stabilizer jack device were encountered in installed applications where the lateral flanges of the mounting channel and strut would spread laterally outwardly allowing the drive screw and strut to become racked and unbalanced in loading. This spreading of the upwardly turned flanges of the strut resulted in failure as the flanges slipped off of the axle tabs.

U.S. Pat. No. 5,205,586 issued to Tallman and assigned to the assignee of the present invention describes a recreational vehicle stabilizer device having jack assemblies mounted at the laterally opposite extremities of telescopical jack housing channels for adjusting the stabilizer device to adapt to different width vehicles. While this device has enjoyed substantial commercial success, it is recognized that the stabilizing forces being directed through the jack housing to the vehicle frame allow for some degree of flex and play in the connections of such housing wherein the driving components of the jack assembly may rack or lock as weight is applied thereto from the interior of the vehicle. Furthermore, the jack assemblies resisted fore and aft longitudinal movement of the vehicle to only a minor extent. Thus, it was found that supplemental fore and aft restraint, supplied by for instance wheel blocks or chocks, was required.

In an effort to provide additional longitudinal restraint, other stabilizer devices provide a transverse frame member attached to the outer end of the jack housing and include angular extending support members attached between the lateral outer extremities of the transverse frame member and the jack assembly. Although these angular support members increase longitudinal stability, the additional components increase manufacturing costs, assembly time and complexity.

Therefore, it has been found desirable to those skilled in the art to provide an easily mountable vehicle stabilizer device that provides both lateral and longitudinal stability to the vehicle upon which it is mounted. The stabilizer device should have a durable construction configured to reduce the possibility of component racking and failure. In addition, such a stabilizer device should be reliable in use and have a minimum number of components which reduces manufacturing costs and assembly time. The present invention meets these needs and others.

SUMMARY OF THE INVENTION

The present invention provides an improved stabilizer jack for convenient securement to the underside of a recreational vehicle. The improved stabilizer jack is relatively inexpensive to manufacture, is relatively trouble-free and reliable in use, and attains an improved result with a minimal number of components.

Briefly, and in general terms, the improved stabilizer jack includes a downwardly opening, elongated channel frame having a longitudinal track and an elongated screw mounted from the frame and restrained from longitudinal movement. A transverse trunnion plate is carried in the track and is formed with a longitudinal threaded bore for engaging the screw. The trunnion plate has one end of a support leg pivotally carried therefrom and a strut is pivotally mounted at its opposite ends between the support leg and the channel frame. The channel frame may be mounted to the underside of the recreational vehicle and the screw rotated to drive the trunnion plate along the track to lower the distal end of the leg while the end of the strut is held captive in close confronting relationship within the track.

More particularly, the channel frame has inner and outer ends and is formed with a downwardly facing top wall and opposite sides projecting downwardly and turned inwardly to cooperate with the top wall to form the track terminating in longitudinal edges spaced a predetermined distance apart. In addition, the jack further includes a hanger bracket disposed at the outer end of the channel frame and formed with a pair of outwardly projecting axle tabs. In particular, the strut has upper and lower ends, the upper end formed with upwardly turned flanges laterally spaced apart a distance slightly less than the predetermined spaced apart distance of such channel frame edges. The strut further includes respective aligned axle tab bores for complementary receipt of such axle tabs therein whereby the flanges of the strut are received in closed spaced relation between the respective edges of the channel frame to constrain lateral outward movement and flexing of the strut flanges thereby maintaining such axle tabs trapped in such bores.

In another aspect of the invention, the support leg includes a bottom wall formed with a pair of laterally spaced apart longitudinal upstanding side walls having outwardly turned reinforcing flanges, the proximal end of the bottom wall being formed at one end with an axial open ended clearance slot. When the screw is rotated, the trunnion plate is driven along the channel frame track and the proximal end of the leg pivots on the trunnion plate to lower the distal end of the support leg downwardly. As such, the proximal end of the bottom wall follows a predetermined arcuate path. Because of the configuration of the support leg relative to the screw, the screw lies in such predetermined arcuate path when the leg is lowered. Thus, as the leg is lowered, the axial clearance slot may accept the screw therein.

Other features and advantages of the invention will become apparent from the following detailed description taken in conjunction with the accompanying drawings, which illustrate by way of example, the features of the invention.

DETAILED DESCRIPTION OF THE PREFERRED EMBODIMENT

As shown in the drawings for purposes of illustration, the invention is embodied in an improved stabilizer jack 10 for convenient attachment to the underside of a recreational vehicle or the like.

The improved stabilizer jack provides both lateral and longitudinal stability to the vehicle upon which it is mounted. The improved stabilizer jack provides restraint against component flexing which can lead to racking of the frame and consequent failure under load. In addition, the improved stabilizer jack is reliable in use and comprises a minimum number of components which reduces manufacturing costs and assembly time. Furthermore, the jack is configured to minimize weight while providing strength and durability.

Referring to the drawings and in accordance with the invention, the improved stabilizer jack generally includes a channel-type mounting frame 12 carrying a longitudinally slidable trunnion plate 13, a longitudinal drive screw 14 rotatably supported on its opposite ends from the trunnion plate and the channel frame, a support leg 16 pivotally connected at one end to the trunnion plate, and a strut member 18 pivotally connected between the midpoint of the support leg and the outer end of the channel frame.

Figure 1:
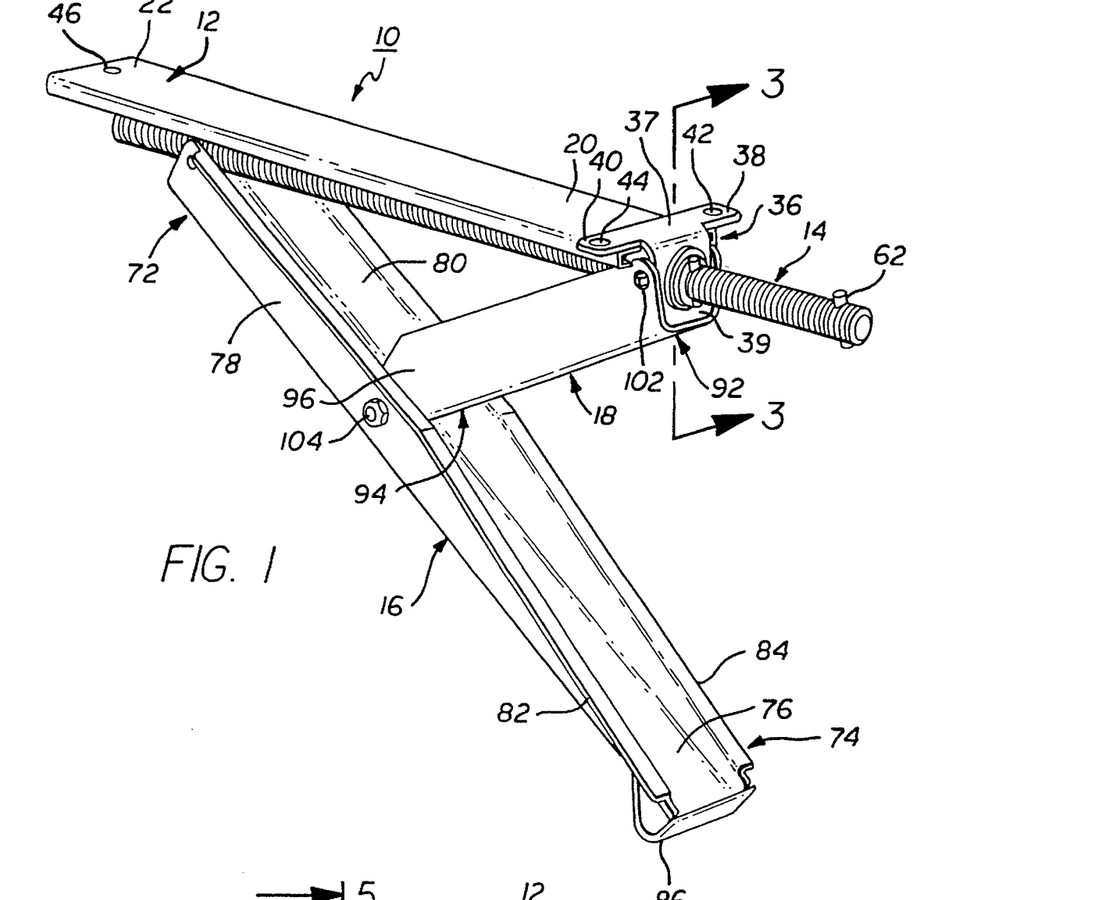
FIG. 1 is a perspective view of an improved stabilizer jack embodying the present invention.
Figures 2, 3:
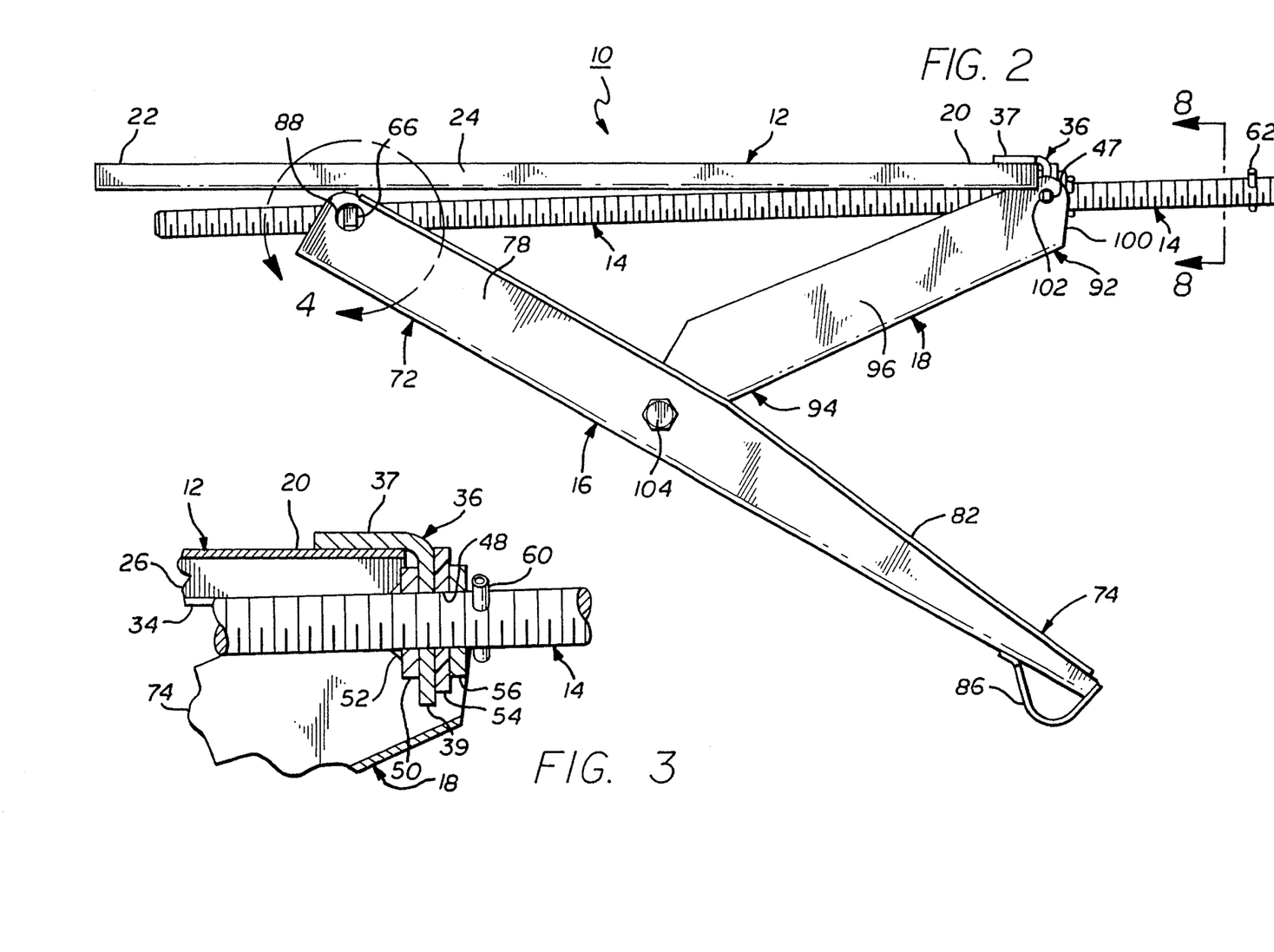
FIG. 2 is an enlarged side view of the improved stabilizer jack shown in FIG. 1.
FIG. 3 is an enlarged broken sectional side view of the improved stabilizer jack shown in FIG. 2 illustrating a drive screw rotatably connected to one end of a channel frame.
Figure 5:
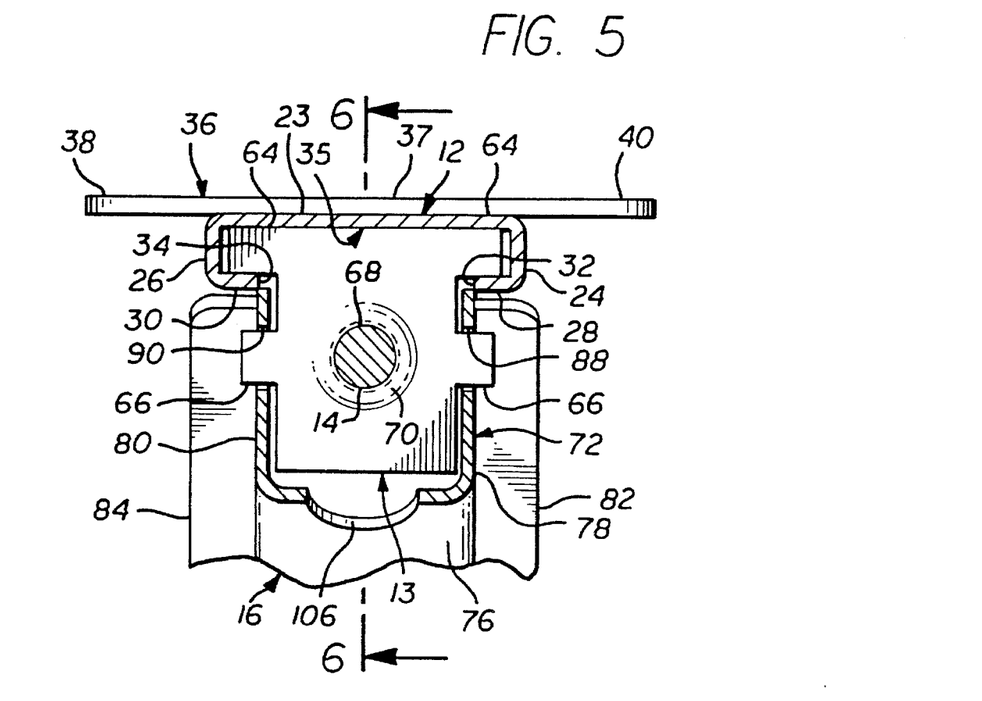
FIG. 5 is a transverse sectional side view taken along line 5—5 of FIG. 4.

With particular reference to FIGS. 1, 2 and 5, the channel frame 12 is generally formed as an elongated downwardly facing C-channel having a planar upwardly facing top surface 19 and outer and inner ends 20 and 22, respectively. As shown in FIG. 5, the mounting frame has a top wall 23 formed with downwardly projecting longitudinal sidewalls 24 and 26 which turn inwardly on their respective lower extremities to form track flanges 28 and 30. The flanges terminate in respective opposed, parallel retaining edges 32 and 34 spaced a predetermined distance apart. The top wall, side walls, and inwardly turned flanges cooperate to form a longitudinal passage defining a track 35 (FIG. 8).

Figures 7, 8:
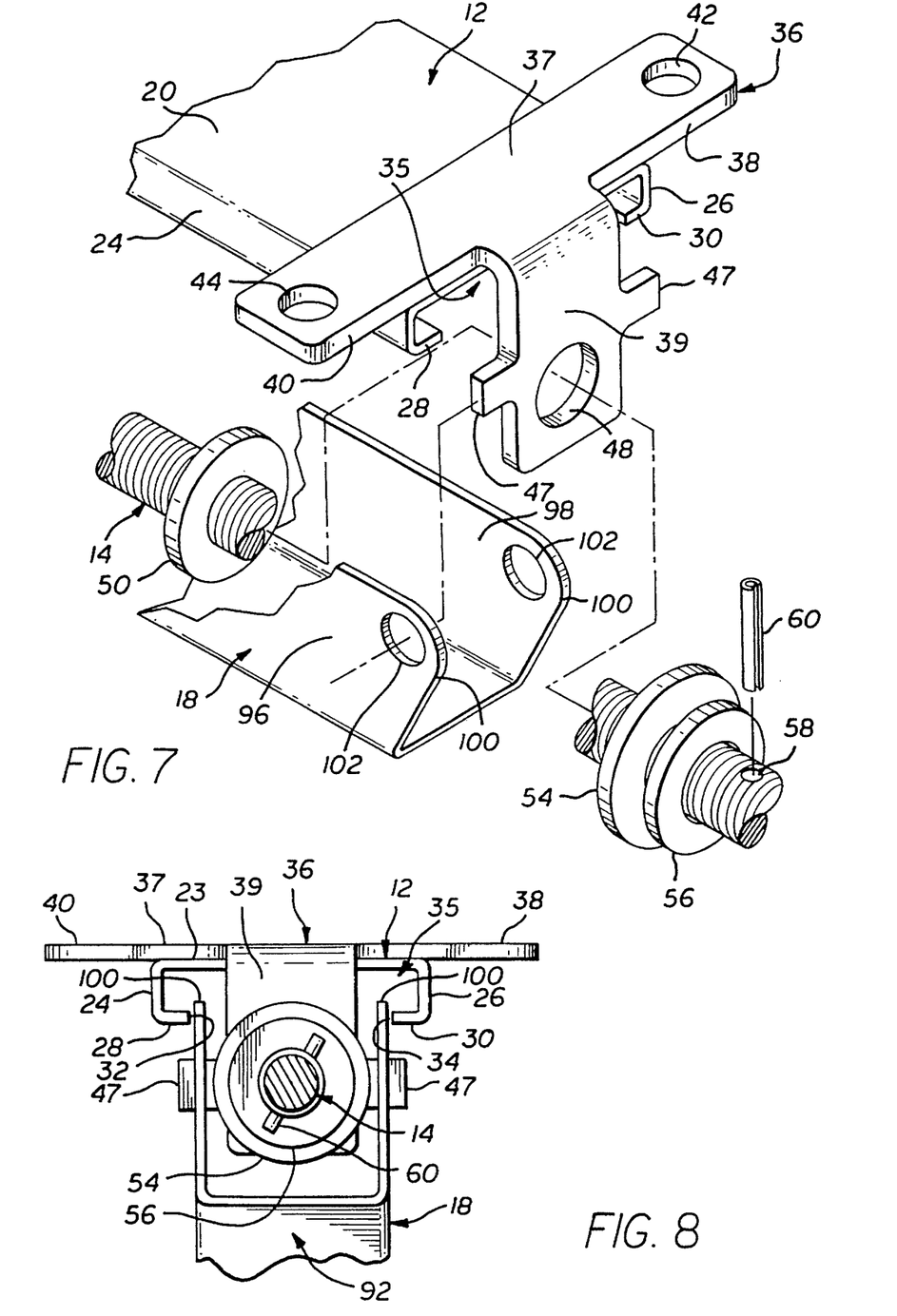
FIG. 7 is an enlarged exploded partial sectional perspective view of one end of the improved stabilizer jack.
FIG. 8 is a an enlarged transverse partial sectional end view taken along line 8—8 of FIG. 2.

Referring more particularly to FIGS. 7 and 8, the channel frame 12 is mounted at its outer end 20 from an L-shaped hanger bracket 36 having a laterally projecting horizontal mounting flange 37 formed with oppositely projecting ears configured with respective mounting bores 42 and 44 and a downwardly bent vertical flange 39 extending downwardly from such horizontal flange 37. The vertical flange overlies the outer end 20 of the channel frame and is formed with a drive screw-receiving bore 48 (FIG. 7). The top wall 23 at the inner end 22 of the channel frame is formed with a vertical through bore 46 (FIG. 1) for receipt of a third mounting bolt (not shown) to be engaged directly with the undercarriage of the vehicle.

The downwardly projecting vertical flange 39 of the bracket 36 is generally cruciform in shape having two outwardly and oppositely projecting axle tabs 47 to which the outer extremity of the strut 18 is connected as described hereinbelow.

With reference to FIGS. 3 and 8, the drive screw 14 mounts a first retaining washer 50 spaced inwardly from its outer end and fixedly secured thereto, for instance by weld bead 52. The screw is received within the receiving bore 48 of the hanger bracket 36 so that the outer end of the screw projects outwardly therefrom. A flat washer 54 is disposed over the outer end of the screw, in turn followed by a second retaining washer 56. The shaft is formed with a first transverse pin retaining bore 58 for friction-fit receipt of a roll pin 60. The pin bore is closely spaced a predetermined distance outwardly from the first retaining washer so that when the roll pin 60 is received in the pin bore, the lateral opposite outwardly projecting ends of such pin abut the second washer, capturing the bracket between the first washer and the flat washer to restrain the screw from axial longitudinal movement relative to the channel frame 12.

As shown in FIGS. 1 and 2, the outer end of the screw 14 is configured to project outwardly beyond the outer end 20 of the channel frame 12 so that when the improved stabilizer jack 10 is mounted to the undercarriage of the vehicle, convenient access to the screw may be had. The outermost end of the screw is formed with a second transverse drive pin bore for receipt of a drive pin 62 fixedly secured therein so that the opposite ends thereof project laterally outwardly from the screw for engagement by a driver. As such, a socket-type wrench having a pair of diametrically opposed slots configured to releasably engage the opposite ends of the drive pin and having a conventional rachet handle or the like may be rotated to turn the screw. A hex head fitting and conventional socket type wrench may be used in the alternative.

Figure 4:
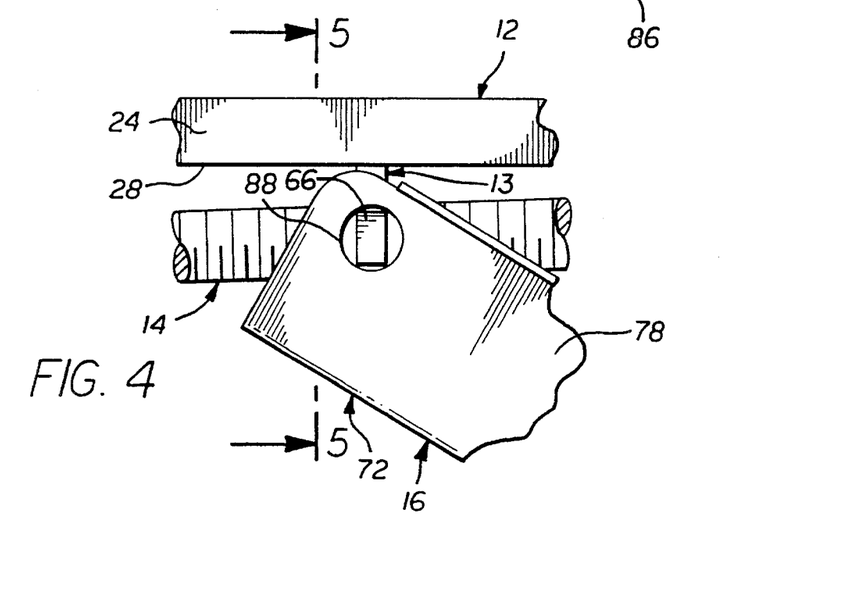
FIG. 4 is an enlarged broken side view of the improved stabilizer jack taken along line 4—4 of FIG. 2 illustrating the pivot connection between a support leg and the drive screw.
Figure 6:
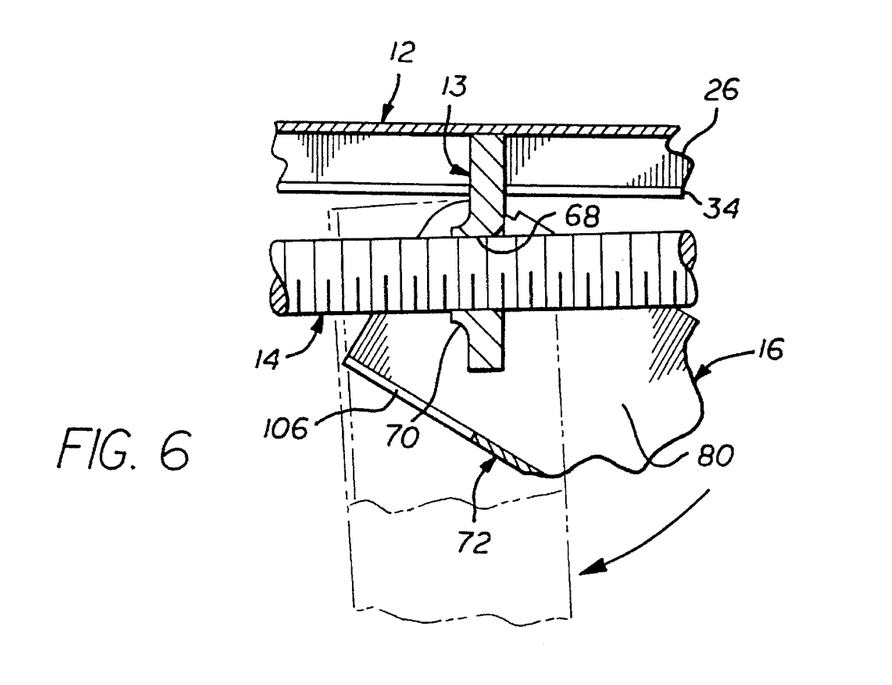
FIG. 6 is a cross sectional side view taken along line 6—6 of FIG. 5.

Referring now to FIGS. 4, 5, and 6, the trunnion plate 13 is generally rectangular having at the top end thereof a pair of laterally oppositely outwardly projecting rectangular retention tabs 64. In addition, a pair of laterally oppositely projecting rectangular axle tabs 66 are formed generally outwardly from the geometric center of the trunnion plate for pivotal connection to the support leg 18. The trunnion plate is further formed with a central threaded through bore 68 for threaded receipt of the screw 14 and surrounded by an annular reinforcing rim 70.

It is to be appreciated that the lateral and vertical dimensions of the suspension tabs 64 have been selected to be received in close fitting, slidable relationship between the top wall 23, side walls 24 and 26, and inwardly turned flanges 28 and 32 of the channel frame 12 to thus suspend such trunnion plate 13 therefrom. The drive screw 14, when received in the threaded bore 68 of the trunnion plate 13, cooperates with such trunnion plate to hold the trunnion plate in a perpendicular relationship relative to the channel frame, wherein the suspension tabs provide a tight tolerance slidable connection within the track to minimize lateral and vertical play between the trunnion plate and the channel frame.

As illustrated in FIG. 1, the support leg 16 is generally formed as an elongated upwardly opening U-shaped channel having proximal and distal ends 72 and 74, the U-channel including a bottom wall 76 formed with laterally spaced apart upwardly extending longitudinal side walls 78 and 80, the upper extremity thereof formed with laterally outwardly projecting longitudinal reinforcing support flanges 82 and 84. The top end of the leg tapers from a medial point downwardly to the distal end of the leg. A curved foot 86 is formed from the bottom edge of the distal extremity of the leg curving downwardly and rearwardly to meet the bottom wall of the U-shaped channel. As shown in FIG. 5, the side walls, at the upper rear portion of the proximal end of the support leg, each have a transverse axle tab bore 88 and 90 for receipt of the respective axle tabs 66 of the trunnion plate 13. In addition, the side walls at the medial portion of the support leg have a transverse strut attachment bore therethrough for pivotal attachment to the strut, described below in detail.

As shown in FIGS. 1 and 2, the strut 18 is generally in the form of an upwardly opening U-shaped channel having upper and lower ends 92 and 94 and including longitudinal upstanding side walls defining spaced apart retainer flanges 96 and 98 along the length thereof. Referring to FIGS. 7 and 8, the upper ends of the retainer flanges 96 and 98 are cut on a cant to slope upwardly and outwardly and then curve around in semi-circles to form retainer rings 100 disposed inwardly of the flange edges 32 and 34 of the channel frame 12. Formed concentric with such rings 100 are respective transverse axle tab pivot bores 102 for receipt of the respective axle tabs 47 of the hanger bracket 36. As shown in FIG. 8, it is to be appreciated that the lateral spacing of the flange edges 32 and 34 of the channel frame 12 is such that the rings 100 forming the upper terminus of the strut 18 and the free edges of the respective retainer flanges 96 and 98 are held in close confined relationship therebetween. As such, the channel frame flange edges constrain the free sides of the retainer flanges therebetween to support the retainer flanges from flexing laterally outwardly sufficiently far enough to clear the opposite ends of the axle tabs 47 which would result in release from the axle tab bores 102 and consequent disassembly.

Referring to FIGS. 1 and 2, the respective flanges 96 and 98 of the strut 18, at the lower end 94 thereof, each include a transverse through bore for receiving a pivot bolt 104 (FIG. 1). As such, the lower end of the strut is pivotally mounted to the medial portion of the support leg 16.

The drive screw 14 is threadably received within the threaded bore 68 of the trunnion plate 13 where, upon rotation of the screw, the trunnion is driven within the track 35 axially toward the outer end 20 of the channel frame 12. As such, a scissor action is translated to the strut 18 and support leg 16 so that the distal end 74 of the support leg travels downwardly relative to the channel frame.

It is to be appreciated that, as the screw 14 is rotated, the proximal end 72 of the support leg 16 pivots on the axle tabs 66 of the trunnion plate 13 to carry the proximal end of the bottom wall 76 thereof along a predetermined arcuate path. As shown in phantom in FIG. 6, the screw may lie in such predetermined path as the distal end of the support leg is extended downwardly. As such, the proximal end of the bottom wall of the support leg further includes an open ended axial clearance slot 106 formed from the proximal extremity thereof such that, when the leg is lowered, the clearance slot may accept the screw and pass therethrough.

It will be apparent to those skilled in the art that the improved stabilizer jack 10 of the invention is intended to be an aftermarket accessory for installation directly to the undercarriage of various trailer and recreational vehicles. A plurality of stabilizer jacks, for instance four, may be mounted to the undercarriage of the vehicle at the outer corners thereof. The channel frame of the stabilizer jack offers a simple mounting configuration so that the jacks may be conveniently mounted at different orientations to conform to various undercarriage frames. For example, the jacks may be oriented so that the outer end of the drive screws 14 are accessible and the jacks mounted in a perpendicular or diagonal outwardly extended orientation relative to the longitudinal axis of the vehicle.

In this regard, it will be appreciated that the flat top side 19 of the channel frame 12 provides for flush mounting against a flat underside of the carriage floor or support beam to thus facilitate direct transfer of support forces from such frame to the undercarriage to thus minimize any uneven transfer of such forces which could lead to uneven loading of the jack and consequent racking of the component parts, a condition that could readily lead to rapid deterioration of the structural integrity of the jack.

Moreover, it is to be appreciated that the lateral spaced apart dimension of the side wall flanges 96 and 98 of the U-shaped channel strut 18 and lateral spaced apart dimension of the side walls 78 and 80 of the support leg 16 are such that, when the support leg is in its retracted position (not shown), the strut nests between the side walls of the support leg. As such, the strut and support leg cooperate in covering relationship under the bottom side of the channel frame 12 to block debris and road dirt from directly impinging upon the drive screw 14. With the jacks in their respective retracted positions, the vehicle may be driven over roadways in the conventional manner. When the driver reaches his or her destination and parks the vehicle, he or she may select a wrench and engage the wrench onto the outer end of the drive screw 14 to engage the drive pin 62. Rotation of the screw will drive the trunnion plate 13 axially within the track 35 of the channel frame 12 to drive the distal end 74 of the support leg 16 downwardly as dictated by the strut 18. The support leg may be lowered sufficiently far to cause the foot 86 of the support leg to engage the ground or other support surface. Further rotation of the screw drives the support leg to a more upright position applying stabilizing forces upwardly through the support legs, through the top wall 23 of the channel frame 12 and directly to the undercarriage frame. The remaining stabilizer jacks positioned at the other corners of the undercarriage frame will then likewise be lowered into their operative positions.

Referring to FIGS. 7 and 8, it will be apparent to those skilled in the art that, should the jack be lowered onto an uneven support surface or otherwise be unevenly loaded, the hanger bracket 36 will operate to hold the upper end of the strut 18 up in position maintaining the free sides of the retainer flanges 96 and 98 positioned between the confronting edges 32 and 34 of the inwardly projecting flanges 28 and 30 of the channel frame 12 to thus limit the degree to which the sides of such retainer flanges 96 and 98 can be flexed outwardly away from another. With continued reference to FIG. 8, it will be appreciated that the respective axle tabs 47 project a distance laterally outwardly beyond the respective vertical plane of the flange edges so that the constraint provided by such edges 32 and 34 will serve to constrain the retainer flanges 96 and 98 themselves against outward flexing to prevent shifting of such retainer flanges outwardly to the point when they will disengage the free ends of such axle tabs 47 from the respective axle bores 102 of the retainer flanges. This then provides the synergistic effect of providing an interlocking relationship whereby the upper ends of the retainer flanges 96 and 98 are, in effect, suspended by the hanger bracket 36 a set distance downwardly from the top wall 19 of the channel frame 12 so that the respective retainer rings 100 are held in spaced relation between the opposed edges 32 and 34 of the channel frame to thus provide for positive holding of the upper end 96 of such strut suspended from the hanger bracket 36 irrespective of the application of heavy and sometimes uneven loads which could otherwise cause the free edges of the retainer flanges 96 and 98 to spread apart and clear the free ends of the respective axle tabs 47 resulting in disassembly of the jack.

Stabilizing forces applied laterally relative to the improved stabilizer jack 10 are braced through the confrontation between the surfaces of the trunnion plate 13 and the channel frame 12 and the confrontation between the surfaces of the strut 18 and the hanger bracket 36. As described above, the respective edges 32 and 34 at the outer end 20 of the channel frame constrain any lateral outward spreading of the side flanges 96 and 98 of the strut 18 retaining the axle bores 102 thereof upon the axle tabs 47 of the bracket while bracing lateral forces. The configuration of the components minimizes the possibility of stabilizer jack racking, buckling, breaking and premature failure over extended periods of time.

Furthermore, it is to be appreciated that the configuration of the various components may be varied for different applications. For instance, the configuration of the axle tabs 47 may be varied to define a cylindrical shape, incorporate bearings or could be configured in two or more sets of components, one to act as a hanger and another to act as an axle.

From the foregoing it can be appreciated that the improved vehicle stabilizer jack of the invention provide both lateral and longitudinal support and stability to a recreational vehicle upon which it is conveniently mounted. In addition, the improved stabilizer jack is easy to operate and reliable in use. The improved stabilizer jack is constructed with a minimal number of components which minimizes weight, reduces assembly time and lowers manufacturing costs. Furthermore, the configuration of the improved stabilizer jack provides sufficient strength and durability to minimize component racking, breaking, and premature failure over extended use.

While particular forms of the invention have been illustrated and described, it will be apparent that various modifications can be made without departing from the spirit and scope of the invention.

What is claimed is:

1. An improved stabilizer jack for securement to he underside of a recreational vehicle, comprising:

a channel frame formed with a top wall having inner and outer ends and opposite side walls projecting downwardly and turned inwardly to form track flanges cooperating with said top wall to form a track and terminating in parallel retaining edges spaced a predetermined distance apart;

an elongated screw rotatably mounted from said frame and restrained against longitudinal movement;

a trunnion plate carried in said track including a threaded bore for engaging said screw and formed with a reinforcing annular rim surrounding said threaded bore and having an inner diameter substantially the same diameter as said bore;

a support leg having proximal and distal ends, said proximal end pivotally carried from said trunnion plate, said distal end projecting downwardly and outwardly from said track;

a strut having upper and lower ends, said upper end formed with upwardly turned retainer flanges spaced laterally apart and received in closed spaced relation between the respective said retaining edges;

a first pivot pin pivotally connecting said upper end of said strut to said frame to hold said upwardly turned retainer flanges interposed between said inwardly turned flanges of said frame; and a second pivot pin pivotally connecting said lower end of said strut to said leg whereby said frame may be mounted to the underside of said recreational vehicle and said screw rotated to drive said trunnion plate along said track to pivot said strut about said first and second pivot pins to lower said distal end of said leg while said first pivot pin holds said retainer flanges constrained between the respective said retaining edges of said track.

2. An improved stabilizer jack according to claim 1 wherein:

said support leg is formed with a bottom wall having a pair of laterally spaced apart longitudinal upstanding side walls having outwardly turned reinforcing flanges.

3. An improved stabilizer jack according to claim 2 wherein:

when said screw is rotated, said proximal end of said leg pivots on said trunnion plate carrying said proximal end of said bottom wall along a predetermined arcuate path such that said screw lies in said predetermined path; and said proximal end of said bottom wall of said support leg further includes a open ended clearance slot formed axially from the proximal extremity thereof to accept said screw therein when said leg is lowered.

4. An improved stabilizer jack according to claim 2 wherein:

said distal end of said support leg includes a downwardly and rearwardly curved support foot.

5. An improved stabilizer jack according to claim 1 wherein:

said screw projects outwardly beyond said outer end of said channel frame and includes a wrench-engaging fitting at the outer end thereof for releasably accepting a wrench to engage said fitting to rotate said screw.

6. An improved stabilizer jack for securement to he underside of a recreational vehicle, comprising:

a channel frame formed with a top wall having inner and outer ends and opposite side walls projecting downwardly and turned inwardly to form track flanges disposed in close spaced relationship to said top wall to form respective slide tracks and terminating in parallel retaining edges spaced a predetermined distance apart;

an elongated screw rotatably mounted from said frame and restrained against longitudinal movement;

a trunnion plate carried in said track including a threaded bore for engaging said screw and oppositely disposed suspension tabs sized to be slidably received in the respective said slide tracks and further including oppositely projecting axle tabs;

a support leg having proximal and distal ends, said proximal end pivotally engaging said axle tabs to be carried from said trunnion plate, said distal end projecting downwardly and outwardly from said track;

a strut having upper and lower ends, said upper end formed with upwardly turned retainer flanges spaced laterally apart and received in closed spaced relation between the respective said retaining edges;

a first pivot pin pivotally connecting said upper end of said strut to said frame to hold said upwardly turned retainer flanges interposed between said inwardly turned flanges of said frame; and a second pivot pin pivotally connecting said lower end of said strut to said leg whereby said frame may be mounted to the underside of said recreational vehicle and said screw rotated to drive said trunnion plate along said track to pivot said strut about said first and second pivot pins to lower said distal end of said leg while said first pivot pin holds said retainer flanges constrained between the respective said retaining edges of said track.

7. An improved stabilizer jack according to claim 6 wherein:

said projecting suspension tabs are sized for close fitting relationship between said downwardly projecting side walls of said channel frame.

8. An improved stabilizer jack for securement to he underside of a recreational vehicle, comprising:

a channel frame formed with a top wall having inner and outer ends and opposite side walls projecting downwardly and turned inwardly to form track flanges cooperating with said top wall to form a track and terminating in parallel retaining edges spaced a predetermined distance apart;

an elongated screw rotatably mounted from said frame and restrained against longitudinal movement;

a trunnion plate carried in said track including a threaded bore for engaging said screw;

a support leg having proximal and distal ends, said proximal end pivotally carried from said trunnion plate, said distal end projecting downwardly and outwardly from said track;

a strut having upper and lower ends, said upper end formed with upwardly turned retainer flanges spaced laterally apart and received in closed spaced relation between the respective said retaining edges;

a first pivot pin pivotally connecting said upper end of said strut to said frame to hold said upwardly turned retainer flanges interposed between said inwardly turned flanges of said frame;

a second pivot pin pivotally connecting said lower end of said strut to said leg whereby said frame may be mounted to the underside of said recreational vehicle and said screw rotated to drive said trunnion plate along said track to pivot said strut about said first and second pivot pins to lower said distal end of said leg while said first pivot pin holds said retainer flanges constrained between the respective said retaining edges of said track; and a hanger bracket mounted to said outer end of said top wall of said channel frame and turned downwardly over said outer end thereof to be formed with a vertical hanger plate configured with oppositely disposed axle tabs projecting laterally beyond the respective vertical plans of the respective retaining edges to define the pivot axis of said first pivot means.

9. An improved stabilizer jack according to claim 8 wherein said:

said retainer flanges are formed with respective axle tab pivot bores and include retainer rings concentric with said bores and configured to, as said strut pivots about said first pivot means, be maintained in position between the respective said retaining edges.

10. An improved stabilizer jack for securement to the underside of recreational vehicle, comprising:

a channel frame formed with a top wall having inner and outer ends and opposite sides projecting downwardly and turned inwardly to form track flanges cooperating with said top wall to form a track and terminating in parallel retaining edges spaced a predetermined distance apart;

a hanger bracket mounted to said outer end of said top wall of said channel frame and turned downwardly over said outer end thereof to be formed with a vertical hanger plate configured with oppositely disposed axle tabs projecting laterally beyond the respective vertical planes of the respective retaining edges;

an elongated rotatable screw received within said through bore of said hanger bracket and restrained against longitudinal movement therein;

a trunnion plate carried in said track including a threaded bore for engaging said screw;

a support leg having proximal and distal ends, said proximal end pivotally carried from said trunnion plate and said distal end projecting downwardly and outwardly from said track;

a strut having upper and lower ends, said lower end of said strut pivotally connected to said leg and said upper end formed with upwardly turned retainer flanges spaced apart laterally a distance less that said predetermined distance, said retainer flanges formed with respective axle tab pivot bores including retainer rings concentric with said bores and configured to be maintained in position between the respective said retaining edges in closed spaced relation therebetween; and whereby said frame may be mounted to the underside of said recreational vehicle and said screw rotated to drive said trunnion plate along said track to pivot said lower end of said strut about said leg and pivot said upper end of said strut about said axle tabs of said hanger bracket to lower said distal end of said leg while said respective edges of said track flanges hold said upwardly turned retainer flanges of said strut constrained between said respective retaining edges so that said axle tab pivot bores are retained on said axle tabs.

11. An improved stabilizer jack according to claim 10 wherein:

said support leg is formed with a bottom wall having a pair of laterally spaced apart longitudinal upstanding side walls having outwardly turned reinforcing flanges.

12. An improved stabilizer jack according to claim 11, wherein:

when said screw is rotated, said proximal end of said leg pivots on said trunnion plate carrying said proximal end of said bottom wall along a predetermined arcuate path such that said screw lies in said predetermined path; and said proximal end of said bottom wall of said support leg further includes an open ended clearance slot formed axially from the proximal extremity thereof to accept said screw therein when said leg is lowered.

13. An improved stabilizer jack according to claim 10 wherein:

said distal end of said support leg includes a downwardly and rearwardly curved support foot.

14. An improved stabilizer jack according to claim 10 wherein:

said screw projects outwardly beyond said outer end of said channel frame and includes a wrench-engaging fitting at its outer end thereof for releasably accepting a wrench to engage said fitting to rotate said screw.

15. An improved stabilizer jack according to claim 10 wherein:

said channel frame is formed with said track flanges disposed in close spaced relation to said top wall to form respective slide tracks;

said trunnion plate includes oppositely disposed suspension tabs sized to be slidably received in said respective slide tracks; and said trunnion plate further comprises oppositely projecting axle tabs pivotally engaged with the proximal end of said leg.

16. An improved stabilizer jack according to claim 15 wherein:

said projecting suspension tabs are sized for close fitting relationship between said downwardly projecting side walls of said channel frame.

17. An improved stabilizer jack according to claim 10 wherein:

said trunnion plate is formed with a reinforcing annular rim surrounding said threaded bore and having an inner diameter substantially the same diameter as said bore.

\* \* \* \* \*